United States Patent
Kim

(10) Patent No.: US 10,219,666 B2
(45) Date of Patent: Mar. 5, 2019

(54) DUST REMOVER FOR VACUUM CLEANER

(71) Applicant: Hyun Tae Kim, Paju-si (KR)

(72) Inventor: Hyun Tae Kim, Paju-si (KR)

( * ) Notice: Subject to any disclaimer, the term of this patent is extended or adjusted under 35 U.S.C. 154(b) by 191 days.

(21) Appl. No.: 15/396,834

(22) Filed: Jan. 3, 2017

(65) Prior Publication Data

US 2017/0251894 A1 Sep. 7, 2017

(30) Foreign Application Priority Data

Mar. 7, 2016 (KR) ........................ 10-2016-0027162

(51) Int. Cl.
| | |
|---|---|
| *A47L 9/20* | (2006.01) |
| *A47L 9/12* | (2006.01) |
| *B01D 46/04* | (2006.01) |
| *A47L 5/28* | (2006.01) |
| *A47L 9/14* | (2006.01) |
| *A47L 5/36* | (2006.01) |
| *B01D 46/00* | (2006.01) |

(52) U.S. Cl.
CPC .......... *A47L 9/20* (2013.01); *A47L 5/28* (2013.01); *A47L 5/365* (2013.01); *A47L 9/127* (2013.01); *A47L 9/1409* (2013.01); *B01D 46/0075* (2013.01); *B01D 46/04* (2013.01)

(58) Field of Classification Search
CPC ... A47L 9/20; A47L 9/10; A47L 9/106; A47L 9/108; A47L 9/12; A47L 9/14; A47L 9/16; B08B 5/04; B01D 46/0075; B01D 46/04
USPC .............................................. 15/352; 55/295
See application file for complete search history.

(56) References Cited

U.S. PATENT DOCUMENTS

| | | | | |
|---|---|---|---|---|
| 1,534,394 | A * | 4/1925 | Kazienko ................. | B44D 3/06 209/358 |
| 4,557,738 | A * | 12/1985 | Menasian ................. | A47L 9/20 55/288 |
| 5,603,740 | A * | 2/1997 | Roy .......................... | A47L 9/20 15/352 |
| 6,248,145 | B1 * | 6/2001 | Radke ................ | B01D 46/0056 55/295 |

(Continued)

FOREIGN PATENT DOCUMENTS

| | | |
|---|---|---|
| JP | 2007268120 A | 10/2007 |
| KR | 1020020091423 A | 12/2002 |

(Continued)

*Primary Examiner* — Monica S Carter
*Assistant Examiner* — Makena S Markman
(74) *Attorney, Agent, or Firm* — Harness, Dickey & Pierce, P.L.C.

(57) ABSTRACT

A dust remover for a vacuum cleaner is provided inside a filter and is rotated by a motor. The dust remover includes: a rigid rotary member perpendicularly coupled to an output shaft of the motor to be rotated according to a rotation of the output shaft; a rotating buffer member assembled with an end portion of the rigid rotary member to be rotatable around a rotary shaft that is in parallel with the output shaft; a striking member having an end portion fixed to the rotating buffer member and another end portion contacting the filter; and an elastic member having an end portion coupled to the rotating buffer member and another end portion coupled to the rigid rotary member so as to apply an elastic recovery force to the rotating buffer member to rotate in a direction in which the rigid rotary member rotates.

4 Claims, 4 Drawing Sheets

(56) References Cited

U.S. PATENT DOCUMENTS

| | | | |
|---|---|---|---|
| 7,086,536 B2 * | 8/2006 | Chu | B01D 46/0065 210/295 |
| 7,318,249 B2 * | 1/2008 | Lin | A47L 5/38 15/352 |
| 8,012,225 B2 * | 9/2011 | Pineschi | A47L 9/20 15/352 |
| 8,186,005 B2 * | 5/2012 | Stewen | A47L 9/20 15/300.1 |
| 2002/0174989 A1 * | 11/2002 | Katayama | B24B 3/245 166/358 |
| 2004/0000022 A1 * | 1/2004 | Rukavina | A47L 5/28 15/339 |
| 2004/0025285 A1 * | 2/2004 | McCormick | A47L 9/1608 15/352 |
| 2005/0000055 A1 * | 1/2005 | Cheng | A47L 9/20 15/352 |
| 2006/0162118 A1 * | 7/2006 | Murphy | A47L 5/28 15/352 |
| 2007/0011842 A1 * | 1/2007 | Moon | A47L 9/1691 15/352 |
| 2007/0017064 A1 * | 1/2007 | Gogel | A47L 9/1666 15/352 |
| 2009/0151306 A1 * | 6/2009 | Lin | B01D 46/0065 55/295 |
| 2009/0223183 A1 * | 9/2009 | Lin | A47L 9/127 55/296 |
| 2016/0030873 A1 * | 2/2016 | Lin | B01D 46/521 55/487 |
| 2017/0266599 A1 * | 9/2017 | Lin | B01D 46/0024 |
| 2017/0274310 A1 * | 9/2017 | Liu | A47L 9/20 |

FOREIGN PATENT DOCUMENTS

| | | |
|---|---|---|
| KR | 1020130115529 A | 10/2013 |
| KR | 101345222 B1 * | 1/2014 |
| KR | 1020140136814 A | 12/2014 |
| TW | 482006 U * | 4/2002 |

* cited by examiner

DUST REMOVER FOR VACUUM CLEANER

CROSS-REFERENCE TO RELATED APPLICATION

This application claims the benefit of Korean Patent Application No. 10-2016-0027162, filed on Mar. 7, 2016, in the Korean Intellectual Property Office, the disclosure of which is incorporated herein in its entirety by reference.

BACKGROUND

1. Field

One or more embodiments relate to a vacuum cleaner, and more particularly, to an apparatus for automatically removing dust from a filter installed in an industrial vacuum cleaner by striking the filter.

2. Description of the Related Art

In general, a drum type vacuum cleaner includes a head portion for sucking air by using a ventilation fan and a main drum body for sucking and filtering impurities such as dust. A cylindrical filter is provided in the main drum body to filter impurities such as dust that is sucked through a suction hole. An operator may manually handle the suction hole. The impurities filtered by the cylindrical filter are stored in a dust container provided under the cylindrical filter. However, during a cleaning process, fine dust is continuously attached to a surface of the cylindrical filter. Accordingly, the performance of the cylindrical filter degrades. According to the related art, the operator has to manually apply a shock to the cylindrical filter to remove the fine dust from the surface of the cylindrical filter.

In this regard, a vacuum cleaner with improved operational convenience by having an automatic function of removing fine dust from a cylindrical filter has been developed and commercialized. Korean Laid-open Patent No. 2013-0115529 discloses an example of a vacuum cleaner having a filter with a dust removal function. According to this above laid-open patent, a motor is installed in an internal space of a cylindrical filter in order to implement a dust removal function of the filter, and a striking rod is provided on a rotary shaft of the motor so that the striking rod strikes the filter while rotating so that dust attached to the filter may be removed.

However, according to the above laid-open patent, as the striking rod that rotates repeatedly strikes the filter, the filter may be damaged.

SUMMARY

One or more embodiments include a vacuum cleaner including a filter with improved durability by using a rotary striking member to improve a structure of a dust remover that strikes the filter while rotating so that a shock applied to the filter is absorbed by the dust remover.

Additional aspects will be set forth in part in the description which follows and, in part, will be apparent from the description, or may be learned by practice of the presented embodiments.

According to one or more embodiments, a dust remover for a vacuum cleaner, wherein the dust remover is provided in an internal space of a filter having a cylindrical shape for filtering dust introduced in the vacuum cleaner and is rotated by a motor so as to repeatedly strike an internal wall of the filter to remove dust attached to the filter, the dust remover includes: a rigid rotary member perpendicularly coupled to an output shaft of the motor to be rotated according to a rotation of the output shaft; a rotating buffer member assembled with an end portion of the rigid rotary member to be rotatable around a rotary shaft in parallel with the output shaft; a striking member of a plate type having an end portion fixed to the rotating buffer member and another end portion contacting the filter to strike the filter; and an elastic member having an end portion coupled to the rotating buffer member and another end portion coupled to the rigid rotary member so as to apply an elastic recovery force to the rotating buffer member to rotate in a direction in which the rigid rotary member rotates.

The elastic member may be a coil spring.

The rotating buffer member may include a guide slot formed as a part of a circular arc at a predetermined distance from the rotary shaft to penetrate through the rotating buffer member, and a guide pin fixedly protruding from the rotary member so as to penetrate through the guide slot.

The striking member may include a synthetic resin.

A pair of the rotating buffer members may be symmetrically arranged at opposite sides of the rigid rotary member with respect to the output shaft.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, one or more embodiments will be described in detail with reference to the accompanying drawings.

Figure 1:
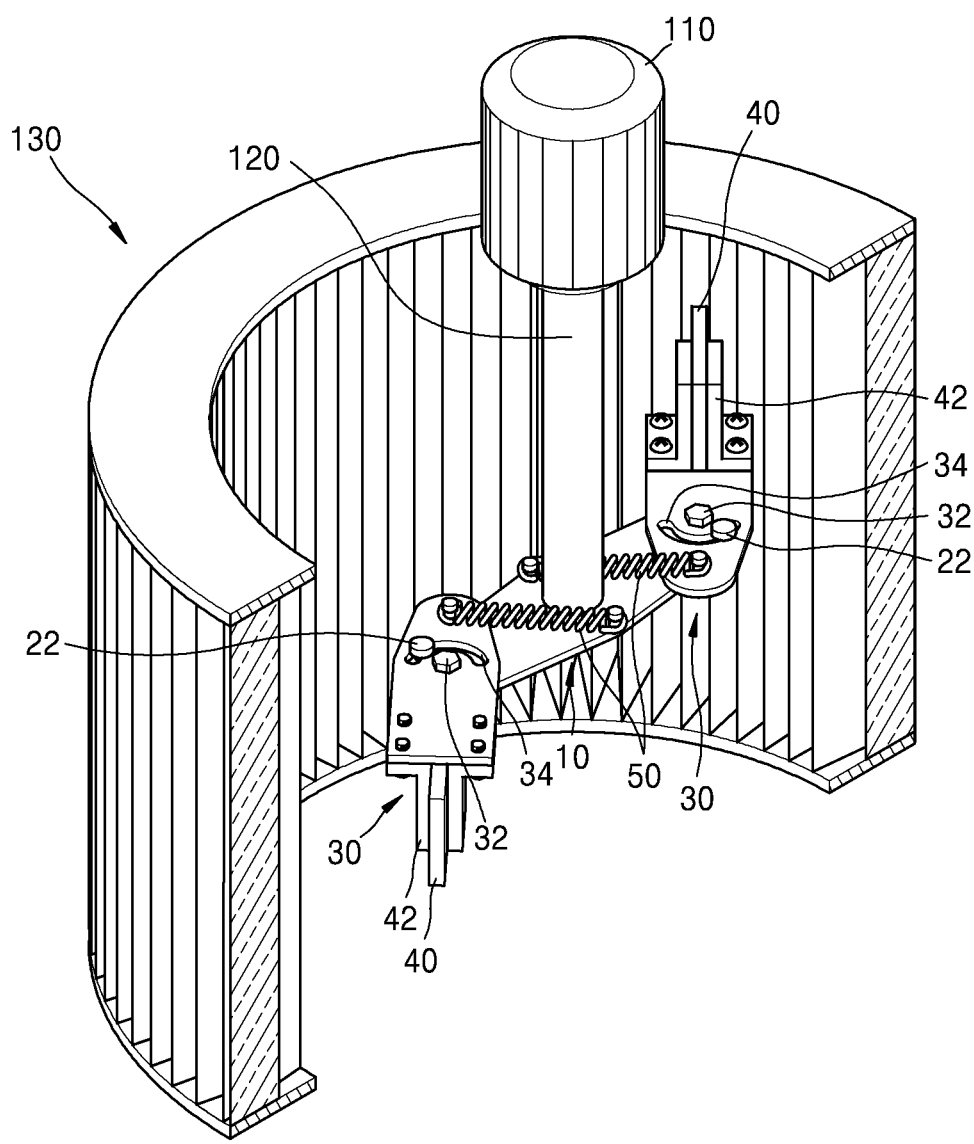
FIG. 1 is a schematic perspective view of a dust remover in a vacuum cleaner according to an embodiment.
Figure 2:
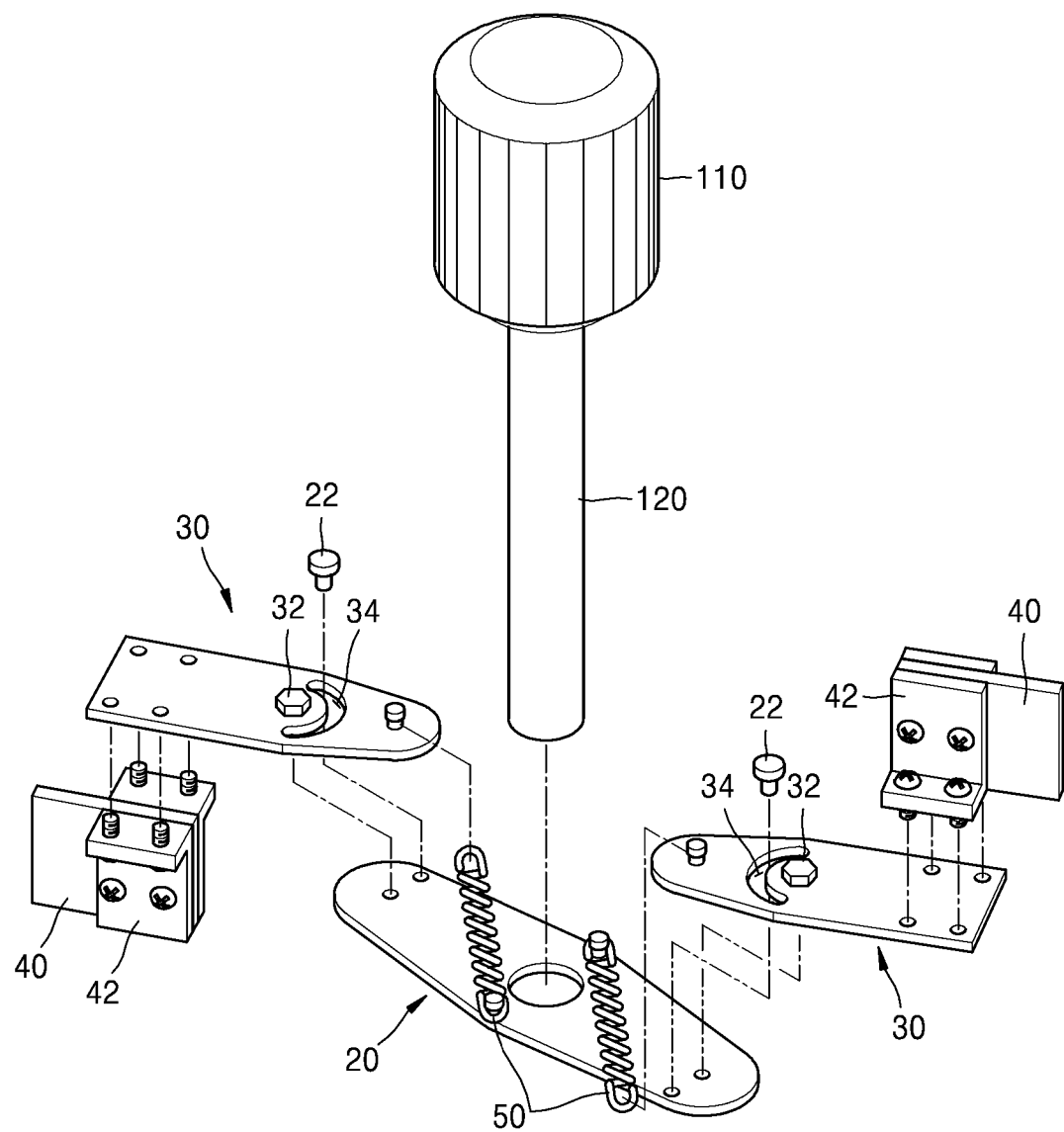
FIG. 2 is an exploded perspective view of the dust remover of FIG. 1.
Figure 3:
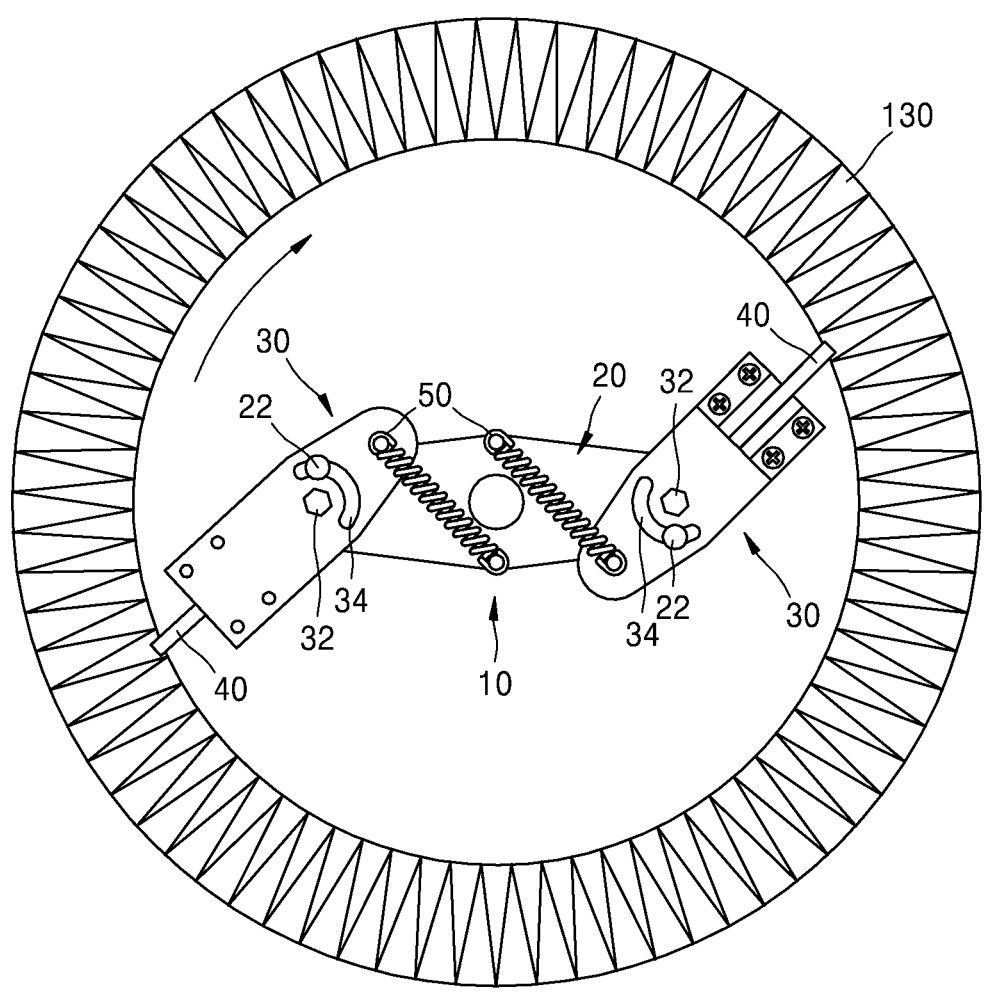
FIG. 3 is a plan view of the dust remover of FIG. 1.
Figure 4:
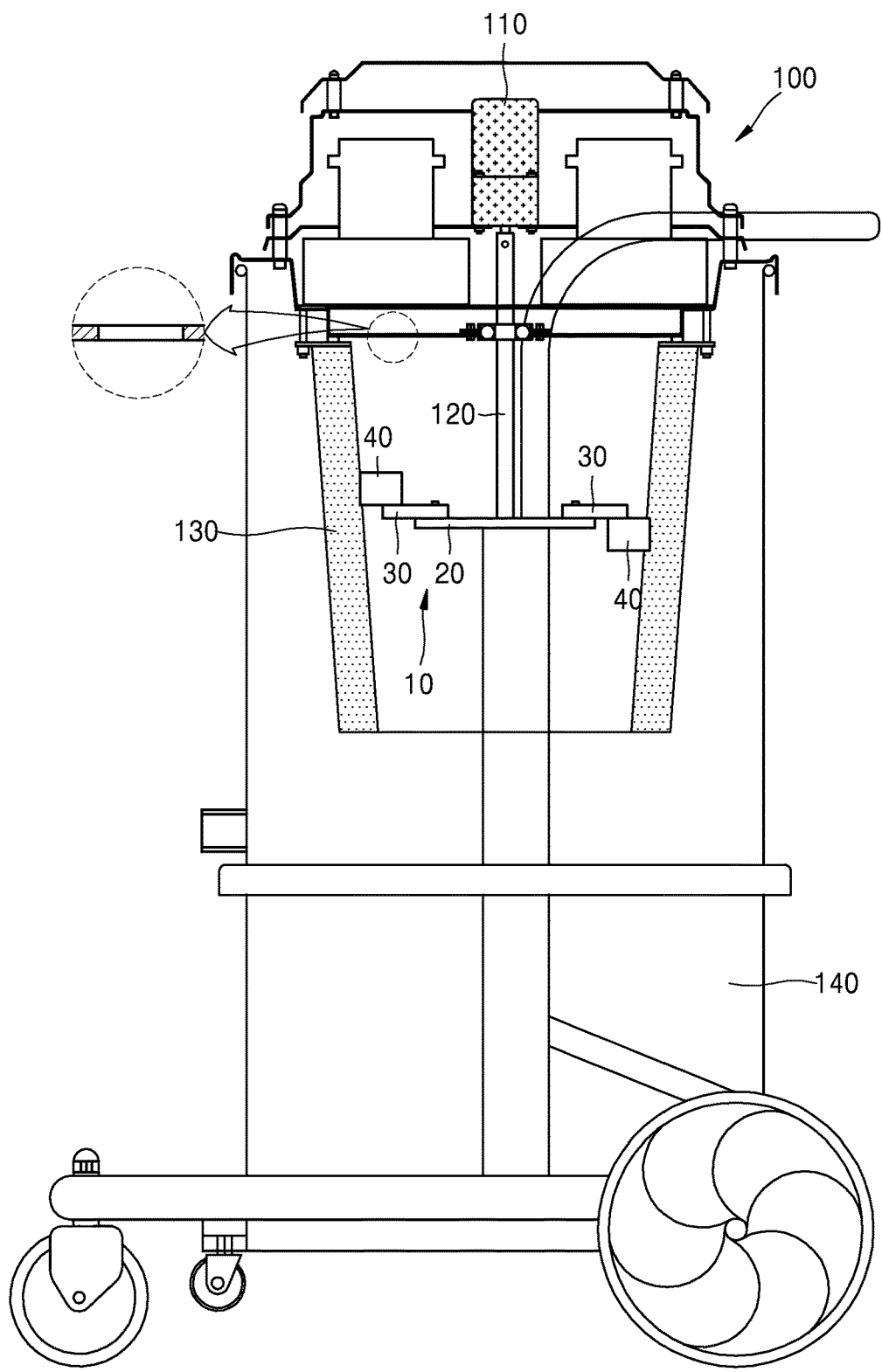
FIG. 4 is a cross-sectional view of a vacuum cleaner including the dust remover of FIG. 1.

FIG. 1 is a schematic perspective view of a dust remover 10 in a vacuum cleaner 100 according to an embodiment. FIG. 2 is an exploded perspective view of the dust remover 10 of FIG. 1. FIG. 3 is a plan view of the dust remover 10 of FIG. 1. FIG. 4 is a cross-sectional view of a vacuum cleaner 100 including the dust remover 10 of FIG. 1.

Referring to FIGS. 1 to 4, the dust remover 10 of a vacuum cleaner 100 according to an embodiment (hereinafter, referred to as the "dust remover") is installed in an internal space of a filter 130 of a cylindrical shape that filters dust introduced into the vacuum cleaner 100. The dust remover 10 is a device that is rotated by a motor 110 and removes dust attached to the filter 130 by repeatedly striking an internal wall of the filter 130.

The dust remover 10 may include a rigid rotary member 20, rotating buffer members 30, a striking member 40, and elastic members 50.

The rigid rotary member 20 is perpendicularly coupled to an output shaft 120 of the motor 110. In particular, the output shaft 120 is disposed perpendicularly with respect to the ground, and the rigid rotary member 20 is disposed in parallel with the ground. The rigid rotary member 20 is a rigid structure including carbon steel. The rigid rotary member 20 is fixed to an end portion of the output shaft 120. The rigid rotary member 20 is formed as a structure of a bar shape. The rigid rotary member 20 may have a symmetric shape with respect to the output shaft 120. The rigid rotary member 20 is rotated by the output shaft 120. A reduction gear module may be installed between the output shaft 120 and the rigid rotary member 20.

The rigid rotary member 20 includes guide pins 22. The guide pins 22 protrude from an upper surface or a lower surface of the rigid rotary member 20. The guide pins 22 are coupled to guide slots 34 that will be described later to guide a rotating movement of the rotating buffer members 30 that will be described later. The guide pins 22 may fixedly protrude from the rigid rotary member 20 so as to penetrate through the guide slots 34. The guide pins 22 may be formed by screw-coupling a member such as a bolt to the rigid rotary member 20.

The rotating buffer members 30 are coupled to end portions of the rigid rotary member 20. Each of the rotating buffer members 30 is formed as a rigid structure. The rotating buffer members 30 are spaced a predetermined distance apart from the filter 130 so as not to directly contact the filter 130. The rotating buffer members 30 are rotatably assembled with the rigid rotary member 20 around a rotary shaft 32 that is arranged in parallel with the output shaft 120. Therefore, the rotating buffer members 30 may be pivoted with respect to the rigid rotary member 20.

The rotating buffer members 30 respectively include the guide slots 34. The guide slots 34 are formed at a constant distance from the rotary shaft 32. Each of the guide slots 34 is formed as a part of a circular arc. The guide slots 34 are holes provided in the rotating buffer members 30. In more detail, each of the guide slots 34 penetrates from an upper surface to a lower surface of each of the rotating buffer members 30. The guide slots 34 are coupled to the guide pins 22 so as to guide the rotating buffer members 30 to perform a stable rotating movement when the rotating buffer members 30 pivot with respect to the rigid rotary member 20.

The rotating buffer members 30 are symmetrically arranged at opposite sides of the rigid rotary member 20 around the output shaft 120. That is, a pair of the rotating buffer members 30 may be provided. When the pair of the rotating buffer members 30 is provided, the striking member 40 is also provided as a pair.

An end portion of the striking member 40 is fixed to the rotating buffer member 30. The other end portion of the striking member 40 is arranged to contact the filter 130 and strike the filter 130. The striking member 40 has a plate-shaped structure. The striking member 40 may be flexible so as to be curved and contact the filter 130 when the striking member 40 strikes the filter 130. The striking member 40 may include a synthetic resin material. The striking member 40 may be fixed to the rotating buffer member 30 by a fixing bracket 42. The striking member 40 is disposed so that an external end portion protrudes from the rotating buffer member 30 toward the filter 130.

An end portion of each of the elastic members 50 is coupled to the rotating buffer member 30. The other end of the elastic member 50 is coupled to the rigid rotary member 20. The elastic member 50 is disposed to apply an elastic recovery force to the rotating buffer member 30 to make it rotate in a direction in which the rigid rotary member 20 rotates. The elastic member 50 may have a structure such as a coil spring or a rubber band. When the coil spring is used as the elastic member 50, the elastic recovery force is applied in a direction in which the coil spring is compressed.

When a pair of striking members 40 is provided, the striking members 40 may be arranged to contact different portions of the filter 130. In more detail, if one of the striking members 40 is fixed on an upper surface of one of the rotating buffer members 30, the other striking member 40 may be fixed on a lower surface of the other rotating buffer member 30.

Hereinafter, operational effects of the dust remover 10 in the vacuum cleaner 100 including the above elements will be described in detail below.

The operational effects of the present disclosure will be described in detail for a case wherein the vacuum cleaner including the dust remover 10 according to the embodiment is used to clean as illustrated with reference to FIG. 4.

The vacuum cleaner 100 is operated to suck dust or impurities from a floor into the vacuum cleaner 100. The dust and impurities sucked into the vacuum cleaner 100 flow to an external wall of the filter 130. Heavy particles or large particles fall down to a lower portion of the filter 130 and are accumulated in a dust collecting tank 140. Light and small particles are attached and accumulated on the external wall of the filter 130. As particles of the dust are stacked on the external wall of the filter 130, a suction force of the vacuum cleaner 100 decreases and an overload may be applied to the motor rotating a ventilation fan. To prevent this, the dust remover 10 operates intermittently or continuously. For operating the dust remover 10, the motor 110 coupled to the rigid rotary member 20 is driven. When the motor 110 operates, the output shaft 120 rotates. As the output shaft 120 rotates, the rigid rotary member 20 rotates according to the rotation of the output shaft 120. When the rigid rotary member 20 rotates, the rotating buffer member 30 rotates according to the rotation of the rigid rotary member 20. In addition, according to the rotation of the rotating buffer member 30, the striking members 40 are integrally rotated with the rotating buffer member 30. Through the above processes, the filter 130 maintains a stationary state, and the striking members 40 strike the filter 130 while rotating. During the above process, the elastic members 50 apply the elastic recovery force so that the rotating buffer members 30 may rotate in a direction in which the rigid rotary member 20 rotates. However, when the striking members 40 strike the filter 130, a repulsive force is generated. The repulsive force applied to the striking members 40 from the filter 130 is transferred to the rotating buffer members 30. Accordingly, the rotating buffer members 30 are forced to rotate in a direction opposite to the rotating direction of the rigid rotary member 20. The repulsive force is greater than the elastic recovery force of the elastic members 50, the elastic members 50 are extended. Accordingly, the repulsive force applied to the striking members 40 may be decreased when the rotating buffer members 30 instantly rotate in an opposite direction to the rotating direction of the rigid rotary member 20 against the elastic recovery force of the elastic members 50. The repulsive force is generated when the striking members 40 pass through ridges of the internal wall of the filter 130. When the striking members 40 pass through a gap between the ridges on the internal wall of the filter 130, the repulsive force applied to the striking members 40 is not generated. Accordingly, the elastic members 50 rotate the rotating buffer members 30 again in a direction in which the rigid rotary member 20 rotates due to the elastic recovery force. When the above processes are repeatedly performed, the striking members 40 strike the ridges of the internal wall in the filter 130 and thus dust is removed from the external wall of the filter 130. Accordingly, the dust falling down from the external wall of the filter 130 is stored in the dust collecting tank 140. Accordingly, the filtering performance of the filter 130 may be improved, and no overload may be applied to the ventilation fan. In addition, when the striking members 40 include a plate-shaped synthetic resin, the striking members 40 may absorb the repulsive force. In addition, when a pair of striking members 40 is provided, each of the striking members 40 may strike different portions of the filter 130 from each other, so that no concentration of striking points on the filter 130 may occur. As described above, as the shock applied to the filter 130 may be effectively removed through the plurality of shock absorbing elements, the lifespan of the filter 130 may be greatly increased.

As described above, according to the dust remover for the vacuum cleaner of the one or more embodiments, the rotating buffer member rotatably coupled to the rigid rotary member rotated by a motor is configured to absorb a shock applied to the filter when the striking members contact the filter, by elastically compressing via the elastic member the rotating buffer member in a direction in which the striking members rotate. Thus, damage to the filter due to the striking members may be effectively prevented, and accordingly, the durability of the filter may be greatly improved in comparison with the vacuum cleaner including the dust remover according to the related art.

It should be understood that the embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope of the inventive concept as defined by the following claims.

What is claimed is:

1. A dust remover for a vacuum cleaner, wherein the dust remover is provided in an internal space of a filter having a cylindrical shape for filtering dust introduced in the vacuum cleaner and is rotated by a motor so as to repeatedly strike an internal wall of the filter to remove dust attached to the filter, the dust remover comprising:
    a rigid rotary member perpendicularly coupled to an output shaft of the motor to be rotated according to a rotation of the output shaft;
    a rotating buffer member assembled with an end portion of the rigid rotary member to be rotatable around a rotary shaft in parallel with the output shaft;
    a striking member of a plate type having an end portion fixed to the rotating buffer member and another end portion contacting the filter to strike the filter;
    an elastic member having an end portion coupled to the rotating buffer member and another end portion coupled to the rigid rotary member so as to apply an elastic recovery force to the rotating buffer member to rotate in a direction in which the rigid rotary member rotates; and
    wherein the rotating buffer member comprises a guide slot formed as a part of a circular arc at a predetermined distance from the rotary shaft to penetrate through the rotating buffer member, and a guide pin fixedly protruding from the rotary member so as to penetrate through the guide slot.

2. The dust remover of claim 1, wherein the elastic member is a coil spring.

3. The dust remover of claim 1, wherein the striking member includes a synthetic resin.

4. The dust remover of claim 1, wherein a pair of the rotating buffer members is symmetrically arranged at opposite sides of the rigid rotary member with respect to the output shaft.

* * * * *